(12) United States Patent
Kutilek

(10) Patent No.: US 6,312,790 B1
(45) Date of Patent: Nov. 6, 2001

(54) METHODS AND APPARATUS FOR DEPOSITING PYROLYTIC COATINGS HAVING A FADE ZONE OVER A SUBSTRATE AND ARTICLES PRODUCED THEREBY

(75) Inventor: Luke A. Kutilek, Oakmont, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 08/992,484

(22) Filed: Dec. 18, 1997

(51) Int. Cl.⁷ .................................................. B32B 17/06
(52) U.S. Cl. ...................... 428/210; 428/426; 428/432; 428/157; 428/213; 296/190.1
(58) Field of Search ..................... 428/142, 144, 428/157, 209, 213, 432, 689, 426, 210; 427/165, 166, 167, 126.3, 258, 269, 455; 296/190.1

(56) References Cited

U.S. PATENT DOCUMENTS

| | | | |
|---|---|---|---|
| 2,208,446 | 7/1940 | Baughman | 179/2 |
| 2,676,114 | 4/1954 | Barkley | 117/38 |
| 3,004,875 | 10/1961 | Lytle | 117/211 |
| 3,244,547 | 4/1966 | Orr et al. | 117/33.3 |
| 3,305,336 | 2/1967 | Browne et al. | 65/60 |
| 3,455,722 | 7/1969 | Kushihashi | 117/45 |
| 3,660,061 | 5/1972 | Donley et al. | 65/32 |
| 3,850,665 | 11/1974 | Plumat et al. | 117/33.3 |
| 3,894,883 | 7/1975 | Franz | 134/15 |
| 3,931,790 | 1/1976 | Franz | 118/73 |
| 4,072,772 | 2/1978 | Franz | 427/164 |
| 4,111,150 | 9/1978 | Donley et al. | 118/7 |
| 4,138,284 | 2/1979 | Postupack | 156/100 |
| 4,147,556 | 4/1979 | Donley | 106/287.18 |

(List continued on next page.)

FOREIGN PATENT DOCUMENTS

| | | |
|---|---|---|
| 0 060 747 | 9/1982 | (EP). |
| 0 060 780 | 9/1982 | (EP). |
| 0 114 282 | 8/1984 | (EP). |
| 0 511 044 | 10/1992 | (EP). |
| 866332 | 4/1961 | (GB). |
| 08-325035 | 12/1996 | (JP). |
| 99/31024 | 6/1999 | (WO). |

OTHER PUBLICATIONS

Merriam–Webster's Collegiate Dictionary, Tenth Edition, Merriam–Webster, Inc. p. 953, 1998.*
Zelazowska, E., "Study of metal oxide and titanium oxinitride coatings on soda–lime glass", *Glass and Ceramic Institute*, Poland, pp. 5–7.

Primary Examiner—Deborah Jones
Assistant Examiner—Stephen Stein
(74) Attorney, Agent, or Firm—Kenneth J. Stachel

(57) ABSTRACT

The present invention is directed to a method of and apparatus for forming a coating having at least one fade zone over a substrate. The method and apparatus include positioning a coating composition dispenser above a surface of a substrate with the coating composition dispenser oriented to dispense a coating composition spray generally normal to the surface of the substrate. A gas dispenser is also positioned above the surface of the substrate and adjacent the coating composition dispenser with the gas dispenser oriented to dispense a gas stream generally normal to the surface of the substrate. The coating composition spray and the gas stream are spaced from each other so as to develop an interference effect therebetween adjacent the surface of the substrate. Preferably the substrate is maintained at a temperature which pyrolyzes the coating composition. The interference effect directs the coating composition to deposit over the substrate as a coating having a fade zone. In an alternative embodiment of the present invention, a plurality of coating composition dispensers and gas dispensers may be positioned over the substrate to provide one or more coatings on the substrate, each of which possesses at least one fade zone.

12 Claims, 4 Drawing Sheets

U.S. PATENT DOCUMENTS

| | | | |
|---|---|---|---|
| 4,160,061 | 7/1979 | Okino et al. | 428/334 |
| 4,208,446 | 6/1980 | Postupack et al. | 430/124 |
| 4,401,474 | 8/1983 | Donley | 106/243 |
| 4,568,578 | 2/1986 | Artsten et al. | 428/34 |
| 4,719,126 | 1/1988 | Henery | 427/165 |
| 4,719,127 | 1/1988 | Greenberg | 427/165 |
| 4,735,861 | 4/1988 | Carlson | 428/432 |
| 4,857,367 | 8/1989 | Thorn et al. | 427/348 |
| 5,168,003 * | 12/1992 | Proscia | 428/216 |
| 5,248,545 * | 9/1993 | Proscia | 428/212 |
| 5,254,392 * | 10/1993 | Bruns et al. | 428/212 |
| 5,271,960 * | 12/1993 | Proscia | 427/164 |
| 5,322,540 | 6/1994 | Jacquet et al. | 65/60.2 |
| 5,393,593 | 2/1995 | Gulotta et al. | 428/220 |
| 5,669,976 | 9/1997 | Yuuki et al. | 118/725 |
| 5,749,931 * | 5/1998 | Goodman et al. | 65/60.01 |
| 5,751,484 * | 5/1998 | Goodman et al. | 359/512 |

* cited by examiner

METHODS AND APPARATUS FOR DEPOSITING PYROLYTIC COATINGS HAVING A FADE ZONE OVER A SUBSTRATE AND ARTICLES PRODUCED THEREBY

BACKGROUND OF THE INVENTION

1. Field of the Invention

The present invention is directed to a method of and apparatus for forming a coating having at least one fade zone on a surface of an article and, more particularly, to a method of and apparatus for pyrolytically depositing one or more metal oxide coatings having at least one fade zone on a portion of a moving float ribbon of glass. The present invention is also directed to articles having a coating formed over a surface of the article, which coating includes at least one fade zone, particularly articles made from the above-described coated float glass ribbon.

2. Description of the Prior Art

As used herein, the term "fade zone" refers to an area or zone of a coated article, e.g. a coated substrate, having a first limit spaced apart from a second limit, in which a coating present over the substrate within the zone gradually decreases in thickness, intensity and/or density from a first thickness, intensity and/or density at the first limit to a second lesser thickness, intensity and/or density at the second limit. The term also refers to an area or zone in which a coating present over the substrate gradually decreases in thickness, intensity and/or density from a first thickness, intensity and/or density at a first limit to an absence of coating over the substrate at a second limit. Such coatings may also be referred to as "graded" or "gradient" coatings.

It is known to form a coating having a fade zone over a substrate. For example, U.S. Pat. No. 3,004,875 to Lytle discloses applying a band of metal salt composition at an oblique angle toward an edge portion of a substrate to be coated, using a shield to limit the area of application of the coating composition. The resulting band is of gradually increasing intensity from its boundary portion adjacent to the edge of the shield because of eddies that evolve beneath the shield near the edge of the shield during the coating operation.

Also, for example, U.S. Pat. No. 2,676,114 to Barkley discloses various methods of producing graded coatings by vacuum deposition using mechanical barriers to apply graded coatings to glass sheets.

U.S. Pat. No. 3,305,336 to Browne et al. discloses a spray gun system used in conventional spray techniques as opposed to electrostatic spray techniques, for applying a film on a glass surface. The film is formed as a band having a major area of maximum intensity bordered by a fade-out line that defines a fade-out area in which the transmittance of the film gradually and progressively increases until its value reaches the clarity of the glass substrate.

U.S. Pat. No. 4,138,284 to Postupack and U.S. Pat. No. 4,208,446 to Postupack et al., disclose a method of forming a graded shade band on a substrate by electrostatically spraying a dye composition past a grounded electroconductive shield or multiple grounded shield system toward a substrate to control the location of the cut-off line between the coated and uncoated regions of the substrate and to limit the amount of dye deposited in the vicinity of the cut-off line to form a graded coating.

Forming coatings, particularly metal oxide coatings, by spray pyrolysis is also known. For example, U.S. Pat. Nos. 3,660,061; 4,719,126 and 4,719,127, each of which are hereby incorporated herein by reference, describe the pyrolytic deposition of metal oxide films onto glass surfaces.

A relatively complex apparatus for forming coatings by spray pyrolysis is described in U.S. Pat. No. 4,111,150, which is hereby incorporated herein by reference. The apparatus is described as being able to obtain special effects in coatings, such as graded or varied thickness films by arranging sets of coating composition dispensers which are moved by a continuous traveling chain over a conveyor to coat glass traveling on the conveyor.

It would be advantageous to provide methods of and apparatus for forming pyrolytically deposited films or coatings having a fade zone, which methods and apparatus are in addition to those that are presently available and, more particularly, which do not require complex apparatus to obtain such a coating.

SUMMARY OF THE INVENTION

The present invention is directed to a method of forming a coating having at least one fade zone over a surface of a substrate. The present invention is also directed to an article which includes a substrate having a coating formed thereon, which coating includes at least one fade zone. Still further, the present invention is also directed to a novel apparatus for forming a coating having at least one fade zone over a surface of an article. In a preferred embodiment of the present invention, the coating is formed by the spray pyrolysis process.

The method for forming a coating having at least one fade zone over a surface of a substrate includes the steps of simultaneously directing a spray of a coating composition and a stream of a gas toward a surface of a substrate. The spray of coating composition and the stream of gas are maintained in spaced relation to one another such that an interference effect adjacent the surface of the substrate is produced between the spray of coating composition and the gas stream wherein the interference effect directs the coating composition to be deposited on the surface of the substrate as a coating having a fade zone. The method includes the step of depositing the coating composition over the surface of the substrate to form a coating having a fade zone over at least a portion of the surface of the substrate.

More particularly, the present invention includes a method for forming a coating having at least one fade zone over a surface of a substrate which method includes the steps of providing at least one coating composition dispenser above a surface of a substrate, wherein the coating composition dispenser is oriented to direct a spray of a coating composition toward the surface of the substrate, providing at least one gas dispenser above the surface of the substrate, wherein the gas dispenser is oriented to direct a stream of a gas toward the surface of the substrate. The method includes the steps of activating the coating composition dispenser to dispense a spray of coating composition and simultaneously activating the gas dispenser to dispense a stream of a gas. The spray of coating composition and the gas stream are maintained in spaced relation to one another such that an interference effect adjacent the surface of the substrate is produced between the spray of coating composition and the gas stream wherein the interference effect directs the coating composition to be deposited on the surface of the substrate as a coating having a fade zone. The method includes the step of depositing the coating composition over the surface of the substrate to form a coating having a fade zone over at least a portion of the surface of the substrate.

In an alternative embodiment of the present invention, the coating composition dispenser may be interposed between a pair of gas dispensers, all of the dispensers being positioned above a surface of a substrate wherein the spray of coating composition and the gas streams are maintained in spaced relation to one another such that an interference effect is produced adjacent the substrate surface between the spray of coating composition and the gas streams, wherein the coating composition is deposited over a surface of the substrate as a coating having a pair of opposed fade zones.

In yet another embodiment of the present invention a plurality of coating composition dispensers and gas dispensers may be provided above the surface of the substrate to provide a plurality of coatings on the surface of the substrate, at least a portion of the coatings including at least one fade zone. The present invention is also directed to a method for providing a coating having at least one fade zone on one or more discrete portions of a substrate surface.

The present invention is also directed to an article of manufacture which includes a substrate having at least one coating formed over a surface of the substrate, which coating includes at least one fade zone. In a preferred embodiment the substrate is glass, e.g. a glass float ribbon or an individual glass sheet, and the coating includes one or more metal oxide coatings, at least one or which includes a fade zone.

The present invention is also directed to an apparatus for depositing a coating having at least one fade zone on the surface of an article, which apparatus includes a device for moving an article in a downstream direction along an article movement path lying in a generally horizontal plane, a coating composition dispenser positioned in spaced relation above the article movement path wherein the coating composition dispenser directs a spray of coating composition downward toward the article movement path, and a gas dispenser positioned in spaced relation above the article movement path and spaced from the coating composition dispenser along a line generally perpendicular to the longitudinal axis of the article movement path wherein the gas dispenser directs a gas stream downward toward the article movement path. The coating composition dispenser and the gas dispenser are positioned relative to one another so as to produce an interference effect between the spray of coating composition and the gas stream which interference effect directs the coating composition to be deposited as a coating having at least one fade zone when directed toward the surface of an article conveyed along the article movement path.

DESCRIPTION OF THE PREFERRED EMBODIMENTS

Figure 1:
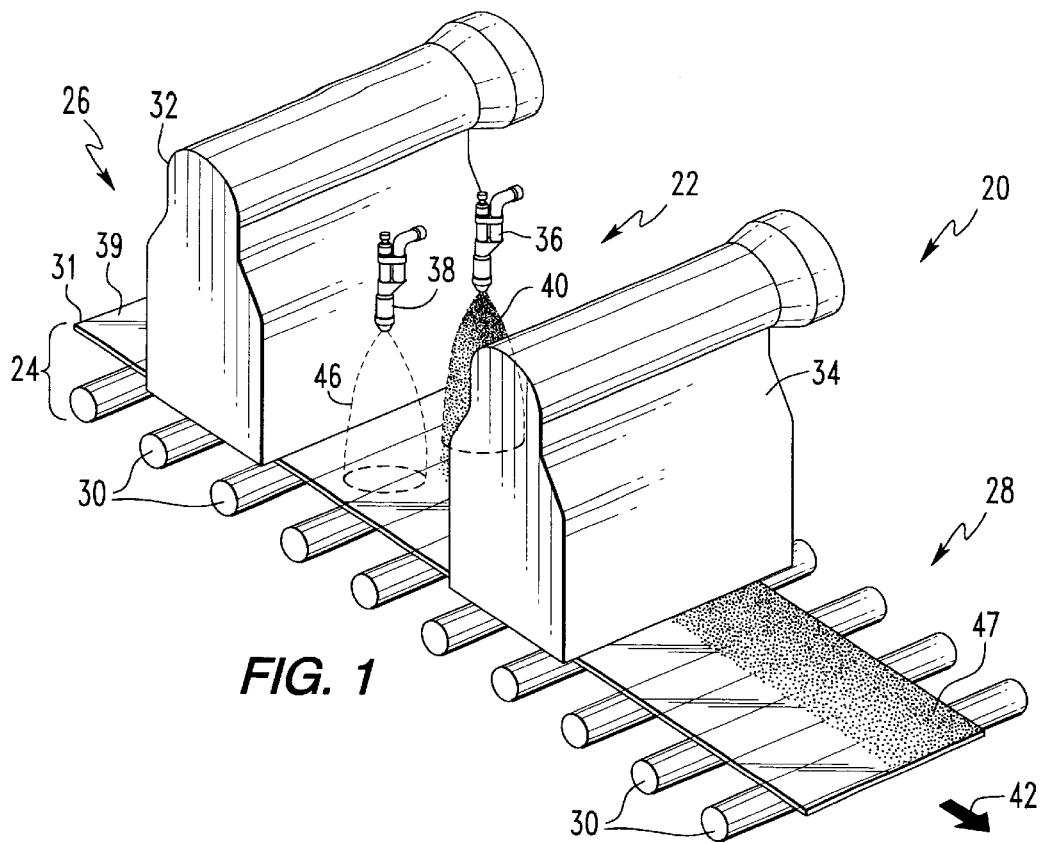
FIG. 1 is a perspective view of an apparatus for depositing a coating having a fade zone over a continuous ribbon-like substrate.

In order to appreciate this invention and its use, it is convenient to consider it in the context of the processes and apparatus in which it may be employed. The invention will be understood more clearly in the light of the description of illustrative embodiments that follows in which in the drawings that form part of the description, like reference numerals refer to like elements.

Referring now to FIG. 1, there is illustrated a coating station 20 for depositing a coating having at least one fade zone over a substrate or workpiece 31. For the sake of brevity, the workpiece 31 over which the coating having the fade zone is deposited is identified in the following discussion as a glass float ribbon, however, as may be appreciated the present invention is not limited to glass float ribbons, nor even to glass substrates or ribbon-like substrates generally, but includes any substrate over which a coating having a fade zone is required or desired. The coating station 20 includes a coating apparatus 22 positioned over conveying facility 24, e.g. but not limiting to the invention a plurality of spaced conveying rollers 30 as illustrated in FIG. 1. In accordance with a preferred practice, at the upstream end of the coating station 20 designated by the numeral 26 is a glass removal and conveying facility extending from a float forming chamber (not shown) in which glass is formed into a continuous ribbon by flotation on molten tin. Thus the workpiece 31 entering and passing through the coating station 20 in the preferred practice of the invention is a glass ribbon which is sufficiently hot, e.g. about in the range of about 1000° F. to about 1500° F. (about 538° C. to about 815° C.), to provide the necessary heat for high-temperature pyrolysis of coating reactants deposited on the glass ribbon in the coating station 20 as described hereinafter. At the downstream end of the coating station designated by the number 28 may be an annealing lehr in which the glass ribbon is controllably cooled to anneal the ribbon and reduce internal stresses within the glass to acceptable levels e.g. for cutting of the ribbon. The coating station 20 is preferably located between a float forming chamber and an annealing lehr in the manner illustrated and described in U.S. Pat. No. 3,660,061 to Donley et al., hereby incorporated herein by reference. Nevertheless, it should be recognized that this invention may be employed in conjunction with a process for treating discrete sheets or plates of glass that are heated in a furnace and conveyed through the coating station 20 and then through a tempering quench to temper the glass or through an annealing lehr to anneal it. It should also be recognized that the movement of the workpiece 31 with respect to the coating station 20 is relative, and that in an alternative embodiment of the present invention the workpiece 31 may be kept stationary while one or more coating stations 20 travel over one or more surfaces of the workpiece 31 to provide one or more coatings having a fade zone over one or more surfaces of the workpiece 31.

With continued reference to FIG. 1, the coating station 20 includes a first exhaust assembly 32 located upstream and spaced from a second exhaust assembly 34 with coating equipment, described in more detail below, therebetween. The exhaust assemblies 32 and 34 are connected at their upper ends to an external exhaust facility (not shown) to discharge unwanted air and products of vaporization and reaction from the coating station 20. The coating equipment includes a coating composition dispenser 36 and a gas dispenser 38, each of which is positioned over workpiece 31. Each dispenser 36, 38 is oriented to dispense respective materials, described in more detail hereinafter, toward and generally normal to the plane of conveyance of workpiece 31, i.e. toward the surface 39 of the workpiece 31. The gas dispenser 38 is spaced from coating composition dispenser 36 along a line which is generally perpendicular to the longitudinal axis of the plane of conveyance of workpiece 31, as shown in FIG. 1. Such a spatial relation enables the development of an interference effect between the respective materials dispensed by coating composition dispenser 36 and gas dispenser 38, which causes the coating composition to be deposited with a fade zone, as describe in more detail hereinafter.

The coating composition dispenser 36 dispenses a coating composition 40 toward and over at least a portion of the workpiece 31 as it travels through the coating station 20 on the conveying facility 24 in the direction of the arrow 42. Preferred coating composition dispensers 36 are spray dispensers which spray atomized liquid coating compositions. The coating composition dispenser 36 is preferably selected to dispense the coating composition 40 in a fan or cone-shaped spray onto at least a portion of the surface 39 of the workpiece 31 in a generally circular or elliptical spray pattern. An elliptical spray pattern 44 is shown intersecting the surface of workpiece 31 in FIG. 2. The size of the spray fan or cone-shaped spray provided by the coating composition dispenser 36 and the distance between the coating composition dispenser 36 and the workpiece 31 are coordinated so that the circular or elliptical spray pattern covers a desired portion of surface 39 of workpiece 31. Coating pressures and volumes through coating composition dispenser 36 are selectably controlled to deposit a desired or required coating pattern and thickness on the surface 39 of the workpiece 31.

The gas dispenser 38 dispenses gas 46 in a stream toward the workpiece 31 that, similar to the coating composition 40, intersects the surface 39 of the workpiece 31. The term "stream" as used herein includes any flow of gas 46, however a generally circular or elliptical pattern is particularly preferred to develop the interference effect described in more detail below. An elliptical gas stream pattern 48 is shown intersecting a surface of workpiece 31 in FIG. 2. The size of the gas stream provided by the gas dispenser 38 and the distance between the gas dispenser 38 and the workpiece 31 are coordinated so that the gas stream covers a desired or required portion of the surface 39 of workpiece 31. The gas may include either a gas which does not react chemically with coating composition 40 or a gas which reacts chemically but favorably to provide a coating 47 over the surface 39 of the workpiece 31. Preferred gases include air, inert gasses and mixtures thereof. Inert gases include but are not limited to nitrogen and the noble gasses, including but not limited to argon and krypton, and mixtures thereof.

Figure 2:
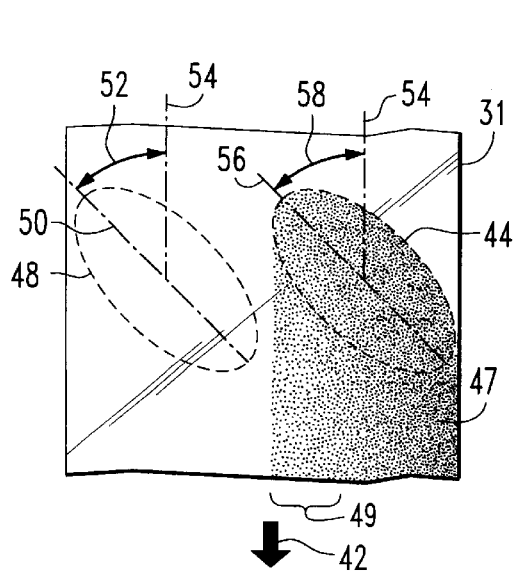
FIG. 2 is a top plan view of the substrate of FIG. 1 illustrating the formation of an interference effect between a coating composition spray and a gas stream.
Figure 3:
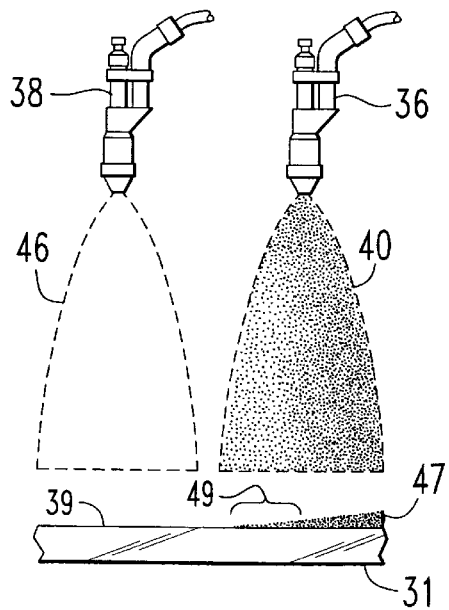
FIG. 3 is side elevational view of a portion of the substrate of FIG. 1 illustrating the deposition of a coating having a fade zone thereon.

It is an important aspect of the present invention that the coating composition dispenser 36 and the gas dispenser 38 are positioned over the workpiece 31 and relative to each other such an interference effect is created between the coating composition elliptical spray pattern 44 and the gas stream adjacent the surface 39 of the workpiece 31, which in turn, causes the coating composition 40 to be deposited over surface 39 of workpiece 31 as coating 47 having a fade zone 49, as shown in FIGS. 2 and 3. More particularly, as illustrated in FIG. 3, the coating 47 is thickest over the area of workpiece 31 where the coating composition spray pattern 44 is subjected to little or no interference effect as it is deposited onto the surface 39. The coating 47 decreases in thickness, or fades in the area where the interference effect is observed until no coating 47 is deposited over the surface 39 of the workpiece 31.

The formation of a fade zone is facilitated where the workpiece 31 is at a sufficiently high temperature which forms a thermal barrier over the surface 39 of the workpiece 31. An important factor in establishing the temperature at which the thermal barrier will form is the boiling point of the coating composition. Generally, as the carrier or solvent comprises the greatest percentage of the coating composition, the boiling point of the carrier or solvent will have the predominant effect on the formation of a thermal barrier. Where the temperature of the workpiece 31 is above the boiling point of the coating composition particularly the carrier or solvent of the coating composition, at least a portion of the droplets of coating composition approaching the surface 39 of the workpiece 31 begin to vaporize. This vaporization process produces expanding gasses which operate to provide an upward force that tends to counter or prevent the deposition of at least a portion of the coating composition particles on the surface 39 of the workpiece 31 operating to suspend these particles of coating composition above the surface 39 of the workpiece 31 until they are either deposited or removed as discussed in more detail below. This phenomenon may be referred to as thermophoresis. For example, where the carrier composition is primarily aqueous, the boiling point of the solvent or carrier may generally be about 100° C. (212° F.) and it is expected that the thermal barrier will be formed at about this temperature.

The temperature of the workpiece 31 may be elevated to form the thermal barrier by any means known in the art, e.g. but not limited to a conventional oven and the like. Alternatively, the process of manufacturing the workpiece 31 may involve a heating operation which imparts sufficient heat to the workpiece 31 to form the thermal barrier, e.g. the process of melting glass frit and forming the glass float ribbon over the molten tin bath.

The presence of the thermal barrier is believed to facilitate the formation of the fade zone for the following reason. Particles of coating composition 40 directed toward the surface 39 of the workpiece 31 by coating composition dispenser 36 typically include particles of varying mass and momentum traveling in several vectors, the majority of which are generally directed toward the surface 39 of the workpiece 31. These particles are carried by momentum and/or the acceleration due to gravity toward the surface 39 of the workpiece 31. These particles tend to deposit in the greatest concentration in and about the area defined by the intersection of the coating composition spray pattern, e.g. elliptical spray pattern 44, and the surface 39 of the workpiece 31. The remaining particles tend to deposit themselves along a gradient extending generally outwardly along the surface 39 of the workpiece 31 in a 360 degree pattern from the above described area of intersection. However, as the workpiece 31 is conveyed by conveying facility 24 along the direction shown by arrow 42, at least along the longitudinal axis of the plane of conveyance of the workpiece 31, little or no gradient effect is observed in the coating 47 for that portion of the surface 39 of the workpiece 31 over which the coating 47 is deposited due to the continuous passing of the surface 39 of the workpiece 31 under the spray pattern 44. It is possible for a gradient effect to be observed along a line generally parallel to the surface 39 of the workpiece 31 which extends generally perpendicular to the plane of conveyance of the workpiece 31, i.e. across the float ribbon. Where the thermal barrier is present over the surface 39 of the workpiece 31, e.g. such as during the pyrolysis process, it tends to counter or prevent the deposition of these particles on the surface 39 of the workpiece 31 by providing a generally opposite force to that provided by momentum and the acceleration of gravity as described above. Between these competing forces, only those particles of coating composition having sufficient momentum or mass to overcome the upward force provided by the thermal barrier are able to deposit themselves on the surface 39 of the workpiece 31. Those particles having insufficient mass or momentum are suspended by the thermal barrier above the surface 39 of the workpiece 31, and remain so suspended until they are either removed by exhaust assemblies 32 or 34 or are able to overcome the upward force of the thermal barrier by either the operation of gravity, dissipation of the thermal barrier by cooling, or both. Where no interference effect is present, i.e. where there is no gas stream 48, these suspended particles will travel considerable distances across the workpiece 31 and deposit themselves in a very random fashion, forming a gradient but heavily mottled or splotchy appearing coating 47 across the workpiece 31, i.e. along a direction generally perpendicular to the longitudinal plane of conveyance of the workpiece 31. Where gas stream 48 is provided and the interference effect is produced, all or at least a majority of these suspended particles of coating composition 47 are constrained from traveling across the workpiece 31, and are removed by exhaust assemblies 32 and 34, resulting in the formation of a controlled, evenly appearing fade zone 49 for the coating 47 across the workpiece 31 as illustrated in the figures, particularly FIG. 3. The unwanted deposition of coating composition 40 over certain areas of the surface 39, i.e. the area beyond the fade zone 49, is thus prevented. Further, the efficiency of the coating process is increased because no additional steps are required to remove coating composition 40 from areas of the substrate where its deposition was not intended to occur.

As may be appreciated, even in the absence of a thermal barrier, the above described interference effect may be employed to provide a controlled, evenly appearing fade zone. However, the efficiency of the process is somewhat reduced because the portions of the surface 39 within the coating station 20 and immediately upstream and downstream of that portion of the surface 39 which is directly under the gas stream 48 at any given instant, are subject to the immediate deposition of the particles of the coating composition. The deposition is immediate due to the absence of a thermal barrier which when present tends to suspend the particles as described above. The swirling coating composition particles in the process of being drawn over the workpiece 31 toward exhaust assemblies 32 and 34 can immediately deposit anywhere on the surface 39 of the workpiece 31 when there is no thermal barrier to force the above described particle suspension, even over those portions of the surface of workpiece 31 where such deposition is not desired, such as that portion of the surface 39 extending beyond the fade zone. This somewhat limits the ability of the interference effect to control or direct the deposition of coating composition particles on the surface 39 of the workpiece 31, particularly for that portion of the surface 39 outside the coated portion or the fade zone, where no coating composition 40 is required or desired. The efficiency of the process may be somewhat reduced, as for example, where additional steps are required to remove coating composition 40 from areas of the surface 39 of the workpiece 31 where its deposition was not intended to occur.

As described above, the respective patterns of the gas stream and the spray of coating composition may have any geometric shape e.g. circular or elliptical, provided the interference effect is produced therebetween. Furthermore, the interaction between each of the respective patterns of gas stream and spray of coating composition may be employed to provide coatings 47 having fade zones with a variety of characteristics.

For example, where the respective patterns are elliptical, having a major axis and a minor axis, the major axis of each ellipse may form any angle with the longitudinal axis of the plane of conveyance of the workpiece 31. Where the major axis of the elliptical gas stream 48 and the major axis of the coating composition spray pattern 44 are each along the same line and that line is generally perpendicular to the longitudinal axis of the plane of conveyance of the workpiece 31 a coating 47 having a relatively wide fade zone having a slightly mottled appearance in the fade zone is produced. It is believed that eddy currents and/or areas of turbulent air flow in the area where the interference effect is observed causes the above described mottling effect.

Alternatively, for example, where the major axis of the ellipse of the respective elliptical patterns of the gas stream 48 and coating composition spray pattern 44 are each generally parallel with each other and with the longitudinal axis of the plane of conveyance of the workpiece 31 and spaced from each other along a line generally perpendicular to the longitudinal axis of the plane of conveyance of the workpiece 31, a coating 47 having a relatively narrow fade zone may be produced.

In yet another alternative embodiment, it has been found that the formation of eddy currents and/or areas of turbulent air flow are significantly reduced where the coating composition 40 spray pattern and the gas stream are both elliptical and where the major axes of each ellipse are generally parallel with each other and lie along a line which is at an approximately 45 degree angle from the longitudinal axis of the plane of conveyance of the workpiece 31. This is illustrated in FIG. 2 where the major axis 50 of elliptical spray pattern 48 of gas 46 is at an approximately 45 degree angle 52 with the longitudinal axis of the plane of conveyance 54 of the workpiece 31. Similarly, the major axis 56 of the elliptical spray pattern 44 of the coating composition 40 is at an approximately 45 degree angle 58 with the longitudinal axis of the plane of conveyance 54 of the workpiece 31, with the major axes parallel to one another. In this embodiment, a relatively wide fade zone is formed on the workpiece 31, having a gradual or evenly appearing fade zone with no mottling. It has been found that when the respective gas stream and coating composition spray patterns are applied in this fashion with the coating composition dispenser 36 and gas dispenser 38 generally balanced in terms of operating pressures, operating volumes and spaced distances from the workpiece 31, that a coating 47 having a desirably gradual, evenly appearing fade zone with no mottling or abrupt fade zones or draw lines may be produced.

The present invention is not limited to forming a single coating 47 having a fade zone over a substrate, but includes the formation of more than one such coating. For example, a plurality of coatings 47 each having a fade zone may be deposited over surface 39 of workpiece 31 where a plurality of paired coating composition dispensers 36 and gas dispensers 38 are positioned upstream and/or downstream of each other between exhaust assemblies 32 and 34. Also for example, a plurality of coatings 47 each having a fade zone may be deposited over surface 39 by providing a plurality of coating stations 20 placed downstream or upstream of each other in succession over the conveying facility 24. In these embodiments of the present invention, a plurality of coatings, each having a fade zone, may be deposited on top of one another as the workpiece 31 moves downstream along its plane of conveyance. In addition, conventional coating stations (not shown) which form coatings without a fade zone may be intermixed with the plurality of coating stations of the present invention to form a mixture of coatings over the substrate, a portion of which may include a fade zone and a portion of which do not include such a fade zone.

Figure 4:
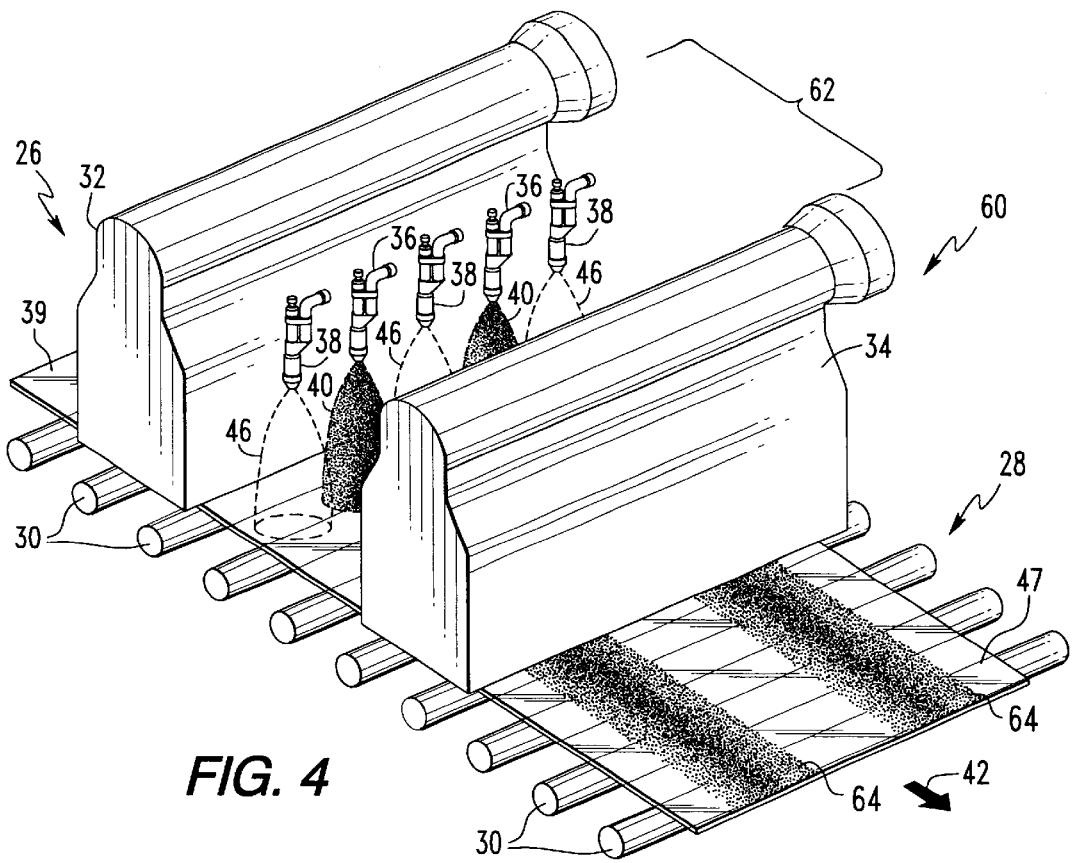
FIG. 4 is a perspective view of an apparatus for depositing a plurality of coatings having a plurality of fade zones over the surface of a continuous ribbon-like substrate, and more particularly an apparatus for depositing two spaced coatings over a surface of a substrate, each of the coatings including a pair of opposed fade zones.
Figure 5:
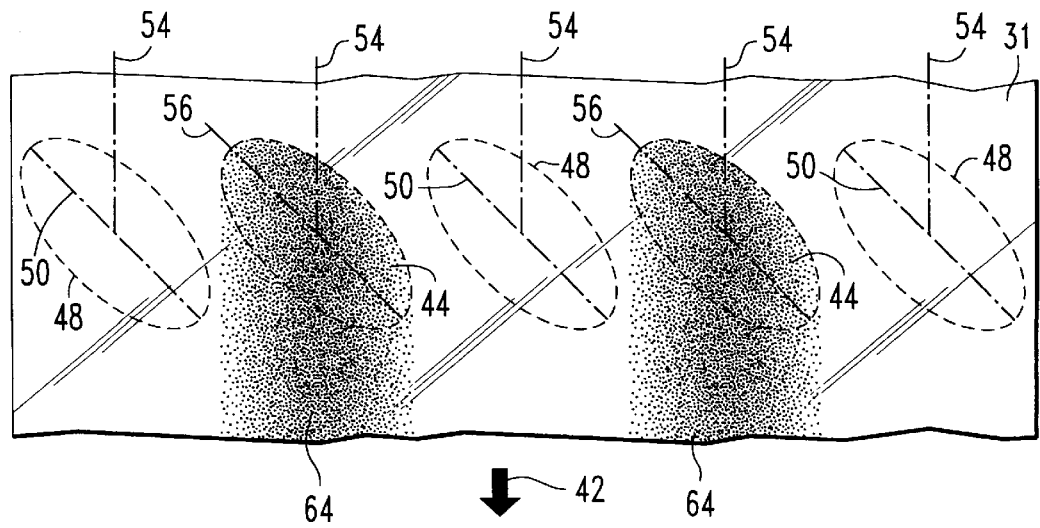
FIG. 5 is a top plan view of the substrate of FIG. 4 illustrating the formation of an interference effect between a plurality of coating composition sprays and a plurality of gas streams to deposit two spaced coatings over the surface of the substrate, each coating having a pair of opposed fade zones.
Figure 6:
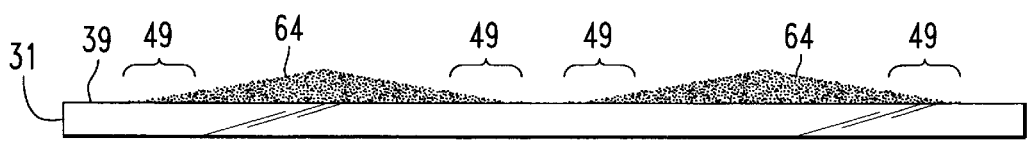
FIG. 6 is a side elevational view of the coated substrate of FIG. 5 illustrating a pair of opposed fade zones of each of the two spaced coatings deposited over the surface of the substrate.

In an additional embodiment of the present invention, two or more separate portions of the surface 39 of the workpiece 31 may each be simultaneously overcoated with a coating 47, wherein one or more of the coatings includes at least two fade zones. Such an embodiment is illustrated in FIG. 4. Referring now to FIG. 4, there is shown a facility for preparing coated glass 60 which is in most respects similar to that of FIG. 2 with like elements bearing like reference numerals, but which includes coating station 62 which includes two coating composition dispensers 36 disposed between three gas dispensers 38 all of which are spaced along a line generally perpendicular to the plane of conveyance of workpiece 31. In a preferred embodiment, the gas stream spray patterns 48 and the spray patterns of the coating composition 44 are elliptical in shape with the respective major axes 50 and 56 parallel with each other and positioned at about a 45 degree angle with the longitudinal axis of the plane of conveyance of the workpiece 31 as illustrated in FIG. 5. The coating composition dispensers 36 and gas dispensers 38 are each spaced from one another to provide interference effects with a minimum of eddy current or turbulent flow which results in the deposition of two coatings 64 over the surface 39 of substrate 31, each coating 64 having a pair of opposed fade zones 49, as illustrated in FIG. 6.

Figure 7:
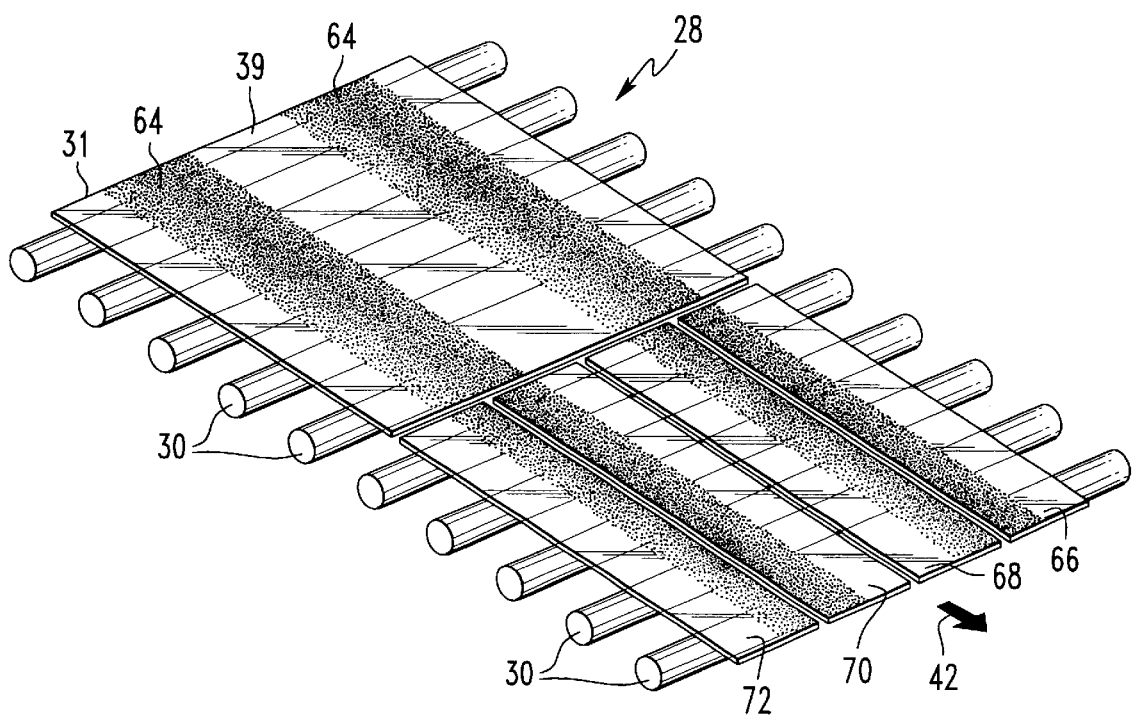
FIG. 7 is a perspective view a continuous ribbon-like substrate having a pair of spaced coatings deposited over a surface of the substrate, each coating including a pair of opposed fade zones, illustrating the sectioning of the coated substrate into subsections, each subsection having a single coating having a single fade zone deposited over a surface of the subsection.

Illustrated in FIG. 7 is an indexing system in which workpiece 31 having two coatings 64 deposited thereon, each of which has at least two fade zones 49, is indexed or cut by a cutting apparatus (not shown) into sub-parts 66, 68, 70 and 72, each of which includes a coating 64 having a single fade zone 49 thereon. While the embodiment illustrated in FIGS. 4 and 5 include two coating composition dispensers 36, as may be appreciated the present invention is not limited thereto, and several coating composition dispensers 36 interposed between gas dispensers 38 in the manner shown in FIGS. 4 and 5 may be used to provide any number of coatings 64 over a workpiece 31.

As may be appreciated, the coating composition 40 is not limiting to the present invention, may be any coating composition known in the art capable of being sprayed toward the workpiece 31 and which is subject to the formation of the interference effect in the presence of gas dispenser 38. Coating compositions capable of pyrolytic deposition are preferred. Particularly preferred are metal oxide coating compositions such as disclosed in U.S. Pat. No. 3,660,061 at column 6, line 45, through column 8, line 25; U.S. Pat. No. 4,719,126 at column 2, line 18, through column 4, line 60, and U.S. Pat. No. 4,719,127 at column 2, line 16, through column 6, line 14, each of which is hereby incorporated herein in their entirety.

Non-limiting examples of selected parameters within which the present invention has been found to be effective will now be described. For many coating applications, coating composition dispenser 36 may include a standard atomizing spray nozzle having a gas feed, typically an air feed, which air feed may be operated at a pressure within the range of about 30 to 60 pounds per square inch gauge (psig), with a volume flow within the range of about 2 to 20 standard cubic feet per minute (scfm) (57 to 570 standard liters per minute (slpm)), preferably in the range of about 3 to 6 scfm (85 to 170 slpm). The coating composition is dispensed through the nozzle at a fluid flow rate of about 25 to 200 milliliters (0.8 to 6.8 fluid ounces) per minute at a pressure of about 1 to 20 psig. Coating composition dispenser 36 may be operated at any distance from the workpiece 31 to provide a desired coating thickness and coated area that provides an acceptable fade zone. A distance of about 10 inches (25.4 centimeters) has been found to be acceptable to provide a coating 47 in the range of about 500 to about 1000 Angstroms thick at its thickest point, having a relatively gradual fade zone, where the coating 47 including the fade zone, is about 9 inches (22.9 centimeters) wide where the gas dispenser is simultaneously employed as described hereinafter. The pressure at gas dispenser 38 operates is within the range which, in combination with its spacing from the workpiece 31 and from coating composition dispenser 36, provides a desirable interference effect to produce an acceptable fade zone. For example, gas dispenser 38 may include a standard spray nozzle operated with an air pressure of about 30 to about 60 psig at a volume flow rate within the range of about 2 to 20 scfm (57 to 570 slpm), more preferably within the range of about 3 to 6 scfm (85 to 170 slpm) when spaced above the workpiece 31 at a distance of about 10 inches (25.4 centimeters). The spacing of gas dispenser 38 from coating composition dispenser 36 may be varied to provide the optimum fade zone for a given application, but a spacing having a distance of about 8 inches (about 20.3 centimeters) along a line generally perpendicular to the longitudinal axis of the plane of conveyance of the workpiece 31 has been found to provide the acceptable fade zone described above for a gas dispenser 38 and a coating composition dispenser 36 operated within the above described operating parameters.

The rate of movement of workpiece 31 along its plane of conveyance may be varied in accordance with the above described flow rates to provide a coating of desired thickness. Within the above range of parameters, a line speed within the range of about 100 to 600 inches per minute (about 254 to about 1524 centimeters per minute) has been found to be acceptable to provide coatings, particularly pyrolytically deposited metal oxide coatings about 500 to 1000 Angstroms thick at the thickest point, when coating composition 40 included about a 10 to 25 percent solids concentration of a metal acetylacetonate in an aqueous suspension dispensed over workpiece 31 when it was maintained within the temperature range of about 1000° F. to 1500° F. (about 538° C. to about 815° C.).

The foregoing parameters and the given ranges are meant to be illustrative and non-limiting. However, it is preferred that whatever operating parameters are selected, the following interrelationships are obtained. Referring now to FIG. 3, a side elevational view of the spray pattern of coating composition 40 and the gas 46 is shown. As may be appreciated, while previously described generally as fan-like or cone-shaped, each of the spray patterns forms what may be more particularly referred to as a bell-shaped curve, with outer edges of the patterns forming a generally parabolic curve. When the coating composition dispenser 36 and the gas dispenser 38 are spaced sufficiently above the surface 39 of the substrate 31, each of outer edges of their respective spray or flow patterns eventually flows along a flow line which is essentially vertical and which intersects the surface 39 of the substrate 31 generally normal to the surface 39. At this point, each of the respective flow patterns impinges the substrate 31 over a surface area which does not appreciably change with increased distance between the respective dispensers and the substrate 31. Thus the preferred minimum distance that coating composition dispenser 36 and gas dispenser 38 are maintained above the surface 39 of the workpiece 31 is that distance which enables each of outer edges of the bell-shaped curves of the respective spray patterns to intersect the surface 39 generally normal to the surface 39. While a greater distance may be selected, it is generally unnecessary and may require greater operating pressures and/or volumes to ensure adequate coating.

Upon selecting the appropriate range for the distance to maintain the coating composition dispenser 36 and gas dispenser 38 above the surface 39 of the workpiece 31 as described above, the respective dispensing pressures and volumes must be selected with a range that is bounded as follows. The upper limit for the pressure and volume for this distance, is that pressure and volume for the coating composition dispenser 36 which forces all or nearly all of the coating composition particles to be forced through the thermal barrier and to deposit on the surface 39 of the substrate 31, thus eliminating suspension of coating composition particles above the surface and the desired interference effect described above, preventing the formation of a fade zone. The upper limit of the pressure and volume for this distance for the gas dispenser 38 is that pressure and volume which creates such turbulent flow that the interference effect is similarly destroyed, similarly preventing formation of the desired fade zone. The lower limit of the pressure and volume for this distance for the coating composition dispenser 36 is that pressure and volume which is so low that insufficient coating composition is directed toward the surface providing too thin of a coating on the substrate. The lower limit of the pressure and volume for the gas dispenser 38 at this distance is the pressure and volume which is insufficient to form the interference effect, generally resulting in the deposition of coating composition particles over all or nearly all the surface 39 of the workpiece 31, preventing the formation of the desired fade zone.

Having selected the distance of the respective dispensers 36 and 38 above the surface 39 of the substrate 31 in accordance with the foregoing, and the respective operating pressures and volumes within the ranges as described, the spacing between the respective dispensers 36 and 38 along a line generally perpendicular to the longitudinal axis of the plane of conveyance the workpiece 31 may be selected within the range that provides the desired interference effect. The interference effect can be selected to produce among other effects, a generally even fade zone, or a mottled less uniform fade zone or to provide a visible line of demarcation between the coated and uncoated portions of the surface 39 of the substrate 31. The spacing between the respective dispensers 36 and 38 to obtain the desired interference effect is also affected where either of the respective spray patterns' geometric shapes are other than circular. For example, as described above, it has been found with the present invention that to obtain a generally even fade zone where the respective gas and coating composition spray patterns are elliptical having a major and minor axis, the major axes of each respective elliptical spray patterns are preferably aligned parallel to each other and at about a 45 degree angle from the longitudinal plane of conveyance of the workpiece 31. In general, reducing the spacing between the dispensers 36 and 38 while maintaining all other factors constant results in the formation of a clear draw line of demarcation between the coated and uncoated portions of the surface 39 of the substrate 31 and may result in the formation of a mottled, uneven fade zone. Similarly, in general, increasing the spacing between the dispensers 36 and 38 while keeping all other factors constant eventually results in the disappearance of an interference effect whereupon the coating composition particles are deposited over all or nearly all the surface 39 of the workpiece 31, preventing the formation of the desired fade zone.

As may be appreciated, the present invention is not limited to any particular application, and may be used where any coating having a fade zone is desired over any substrate. However, in a particularly preferred embodiment, the present invention is employed to provide a pyrolytically deposited coating having a fade zone over a substrate, particularly a glass substrate.

By way of non-limiting examples, the present invention is particularly useful for forming shade bands, privacy bands/coatings and/or decorative/aesthetic bands/coatings having fade zones over glass substrates such as the glass substrates used in land, sea, air and space vehicles and in architectural structures such as buildings and the like. As used herein the term "shade band" refers that portion of a glass substrate coated with one or more coatings which function to reduce the amount of light energy, particularly visible light energy, transmitted through the glass substrate. Shade bands are commonly employed for example, along a portion of an automobile windshield, particularly near that portion of the windshield adjacent the roof line of the vehicle, to reduce the amount of sunlight transmitted through the windshield to provide a shaded band for the comfort of the vehicles occupants. As used here the term "privacy band" or "privacy coating" refers to that portion of a glass substrate coated with one or more coatings which function to prevent or reduce the ability to view the interior of the vehicle or building through the glass substrate from a position exterior of the vehicle or building. Where such a coating or coatings is/are present over only a portion of a glass substrate it may be referred to as a privacy band. Where such a coating or coatings is/are present over an entire glass substrate, as for example, an automobile sidelight, it may be referred to as a privacy coating. Privacy coatings and privacy bands may be employed for example, on the sidelights and backlights of automotive vehicles to provide privacy for the vehicle's occupants. As used herein, the term "decorative/aesthetic bands/coatings" refers to "bands" or "coatings" as those terms are described above which function to provide a decorative or aesthetic appearance to the glass substrate. While such bands or coatings may incidentally provide shading or privacy, the primary function of the decorative/aesthetic coating or band is to provide the decorative or aesthetic function described above. Bands or coatings which by design perform mixed privacy, shading and/or aesthetic functions may also be employed for certain applications.

In each of the above described shade band/coating, privacy band/coating and/or decorative/aesthetic band/coating applications, the present invention may be employed to provide privacy, shading and/or aesthetic bands/coatings having a fade zone between a first portion of the glass substrate coated with the privacy, shading and/or aesthetic bands/coatings and a second portion of the glass substrate (or of adjacent glass substrates) which is/are not coated with the privacy, shading and/or aesthetic band/coating.

Figure 8:
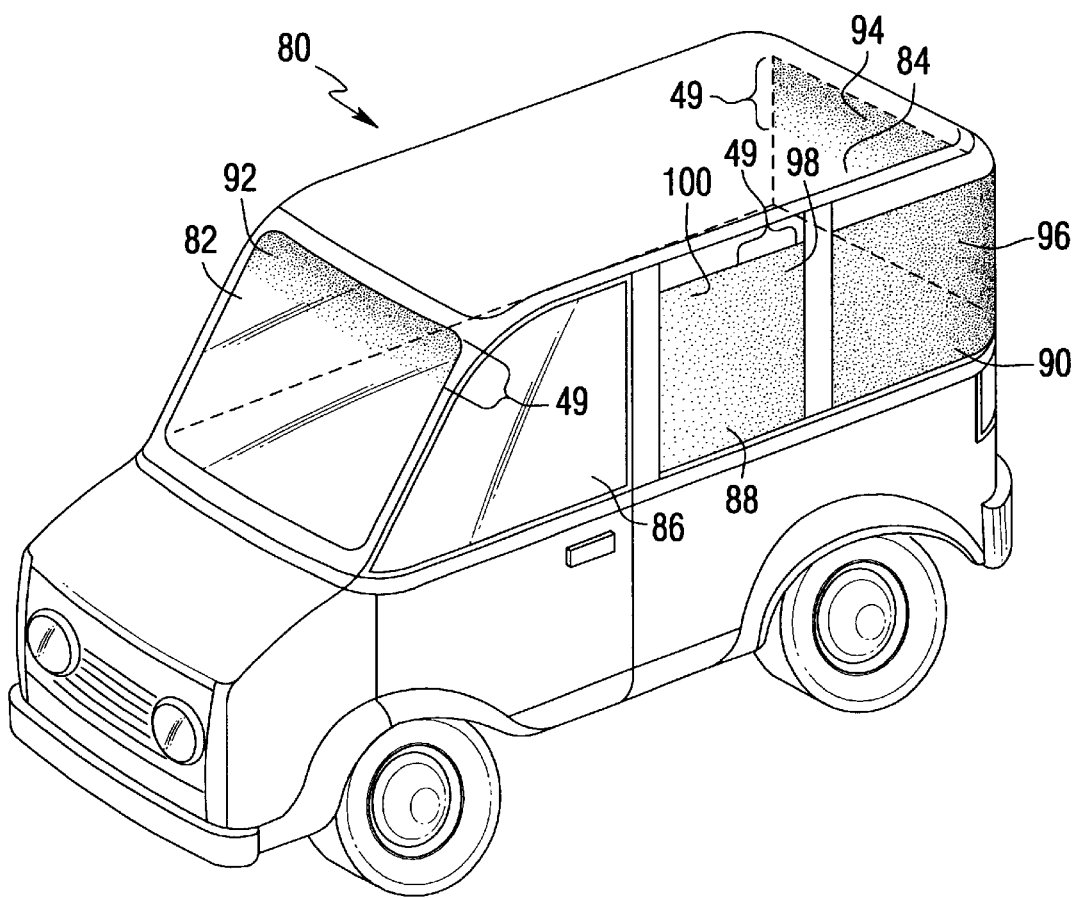
FIG. 8 is a perspective view of an automotive vehicle incorporating coatings having a gradient fade zone in the windshield, sidelights and backlight of the vehicle.

For example, referring now to FIG. 8 there is shown an automotive vehicle 80 which includes windshield 82, backlight 84 and side lights 86, 88 and 90. Windshield 82 includes shade band 92 which includes fade zone 49 which shade band 92 is formed as a coating deposited on a surface of windshield 92 in accordance with the present invention. The shade band 92 may be formed on either the interior or exterior surface of windshield 92. Similarly, backlight 84 shown in phantom, includes shade band 94 which includes fade zone 49. Shade band 94 is formed as a coating deposited on a surface of backlight 84 in accordance with the present invention. The shade band 94 may be formed on either the interior or exterior surface of backlight 84.

Also illustrated in FIG. 8 is sidelight 86 which includes no privacy coating deposited thereon. In contrast, sidelight 90 includes privacy coating 96. Sidelight 88 includes a privacy coating 98 which includes fade zone 49 which fades to provide portion 100 of sidelight 88 which has no privacy coating 98 deposited thereon. In this fashion, sidelight 88 operates to provide an aesthetically pleasing transition between sidelight 90 which includes a full privacy coating 96 to sidelight 86 which contains no privacy coating deposited thereon. The privacy coating 98 including fade zone 49 was formed in accordance with the present invention. Either of privacy coatings 96 and 98 may be deposited on either the interior or exterior surfaces of the respective sidelights 90 and 88.

As may be appreciated, the present invention is not limited to the precise embodiment illustrated in FIG. 8, and it is within the scope of the present invention to include any of the shade band coatings, privacy bands, privacy coatings, aesthetic bands, aesthetic coatings or mixtures thereof on any of the windshield 82, backlight 84 or sidelights 86, 88 and 90 illustrated in FIG. 8. For example, as may be appreciated, backlight 84 may have deposited thereon in lieu of or in addition to shade band 94 a privacy coating, (not shown) which privacy coating may or may not include a fade zone in accordance with the present invention.

The coatings having the fade zone of the present invention may provide other functions in addition to the shading, privacy and/or aesthetic functions described above, including but not limited to providing ultraviolet radiation absorption, low emissivity, or antireflection capabilities to glass or other substrates. In addition, the coatings of the present invention which include the fade zone may be present for a given function (e.g. shading) and may be combined with one or more other coatings to provide the coated article with additional functionality (e.g. low emissivity, color, etc.).

The present invention will be further understood from the description of the specific non-limiting example which follows.

EXAMPLE 1

A sheet of clear float glass, measuring about 30 inches (76 cm) in length by about 25 inches (64 cm) in width by about 0.25 inches (0.64 cm) in thickness was heated in an oven to a temperature of about 1150° F. (621° C.). The heated glass sheet was removed from the oven and was immediately introduced into a coating station of a spray pyrolysis apparatus on a set of conveying rollers, which caused the glass sheet to travel at a line speed of about 250 inches (635 cm) per minute through the coating station.

The coating station included a first exhaust assembly measuring about 12 inches (30 cm) in width by about 36 inches (91 cm) in length which was spaced approximately 15 inches (38 cm) from a second exhaust assembly having roughly the same dimensions. The exhaust assemblies were each spaced about 2 inches (5.08 cm) above the glass substrate, and each was operated at an air flow of about 350 standard cubic feet per minute (hereinafter "scfm").

Located approximately midway between the exhaust assemblies was a coating composition dispenser. The coating composition dispenser included a conventional compressed air atomizing spray nozzle. The coating composition dispenser was oriented to dispense a coating composition generally normal to the surface of the glass sheet and was located approximately 10 inches (25.4 cm) above the glass sheet. A coating composition which included a 17% solids concentration of a cobalt-chromium-iron acetylacetonate dispersed in water was dispensed through the coating composition dispenser at a rate of about 75 milliliters (2.5 fluid ounces) per minute and at a pressure of about 8 psig. The coating composition was deposited in an generally elliptical pattern that intersected the glass sheet in an ellipse measuring generally about 16 inches (41 cm) along its major axis by about 8 inches (20 cm) along its minor axis. The major axis of the ellipse was generally at about a 45 degree angle to the longitudinal axis of the plane of conveyance of the glass sheet through the coating station.

An gas dispenser which included a conventional compressed air atomizing spray nozzle was oriented to dispense a stream of air generally normal to the surface of the glass sheet. The nozzle was located approximately 10 inches (25.4 cm) above the glass sheet. The gas dispenser was positioned approximately 8 inches (20 cm) away from the coating composition dispenser along a line generally perpendicular to the longitudinal axis to the plane of conveyance of the glass sheet through the coating station. Atmospheric compressed air was dispensed through the gas dispenser at a rate of about 5 scfm at a pressure of about 50 psig. The air steam pattern was a generally elliptical pattern where it intersected the glass sheet, with the ellipse measuring generally about 16 inches (41 cm) by about 8 inches (20 cm). The major axis of the ellipse was generally at about a 45 degree angle to the longitudinal axis of the plane of conveyance of the glass sheet through the coating station.

The coating composition dispenser and the gas dispenser formed an interference effect which caused the pyrolytic deposition of a cobalt-chromium-iron metal oxide coating having a gradual, evenly appearing fade zone. The coating at its thickest point was approximately 500 Angstroms thick in an area corresponding generally to that beneath the coating composition dispenser which extending generally along a longitudinal edge of the glass sheet in along the longitudinal axis of the plane of conveyance of the glass sheet through the coating station. The fade zone extended along a line generally perpendicular to the longitudinal axis of the plane of conveyance of the glass sheet, i.e. across the glass sheet. By visual observation, the coating appeared to fade completely and generally evenly approximately 5 inches (13 cm) from the longitudinal edge of the glass sheet, resulting in the formation of a shade band on the sheet having a fade zone which shade band, including the fade zone, was approximately 5 inches (13 cm) wide.

The above example is offered to illustrate the present invention and is not intended to limit the invention. Various modifications are included within the scope of the invention, which is defined by the following claims.

What is claimed is:

1. An article of manufacture comprising:

a float glass ribbon substrate having at least one major surface; and at least one pyrolytically deposited coating deposited over the major surface of the substrate from the simultaneous directing in spaced apart relation to each other of a spray of a coating composition and a stream of gas toward the surface of the substrate such that an interference effect adjacent the surface of the substrate is produced between them so that the interference effect results in the deposited coating comprising a fade zone such that the coating has a first limit spaced apart from a second limit, in which the coating gradually decreases in the parameter selected from the group of: thickness, intensity, and density and any combination of these from the first thickness, intensity and/or density at the first limit to a second lesser thickness, intensity and/or density at the second limit.

2. The article of manufacture of claim 1 wherein the coating includes a pyrolytically deposited metal oxide coating.

3. The article of manufacture of claim 2 wherein the glass substrate is a glass sheet selected from the group consisting of an architectural transparency, an automotive vehicle windshield, an automotive vehicle sidelight and an automotive vehicle backlight.

4. The article of manufacture of claim 3 wherein said coating is selected from the group consisting of a shade band, a shade band coating, a privacy band, a privacy coating, an aesthetic band, an aesthetic coating and mixtures thereof.

5. The article of manufacture of claim 4 wherein said fade zone is generally parallel to a horizontal axis of the glass substrate.

6. The article of manufacture of claim 4 wherein the fade zone is generally parallel to a vertical axis of the glass substrate.

7. The article of claim 1 wherein said coating comprises at least one metal oxide film.

8. The article of claim 1 wherein said coating is formed from a coating composition selected from the group of at least one organometallic compound dissolved in at least one organic solvent, at least one organometallic compound suspended in a non-aqueous carrier and at least one organometallic compound suspended in an aqueous carrier.

9. The article of claim 1 wherein said coating at least along the longitudinal axis of the article has little gradient effect for that portion of the surface of the article over which the coating is deposited and wherein the coating has a gradient effect observed along a line generally parallel to the surface of the article.

10. The article of claim 1 wherein the coating has a first limit spaced apart from a second limit, in which the coating gradually decreases in the parameter selected from the group of: thickness, intensity, and density and any combination of these from a first thickness, intensity and/or density at the first limit to an absence of coating over the substrate at a second limit.

11. The article of manufacture of claim 1 wherein the coating is from pyrolytic deposition of the coating composition on the substrate at a temperature in the range of about 1000° F. to about 1500° F. (about 538° C. to about 815° C.).

12. The article of manufacture of claim 1 wherein the coating is from the pyrolytic deposition of the coating composition through a thermal barrier resulting from the substrate having a temperature above the boiling point of the coating composition from a material selected from the group of carrier or solvent present as the greatest percentage of a component in the coating composition.

* * * * *